2,897,082

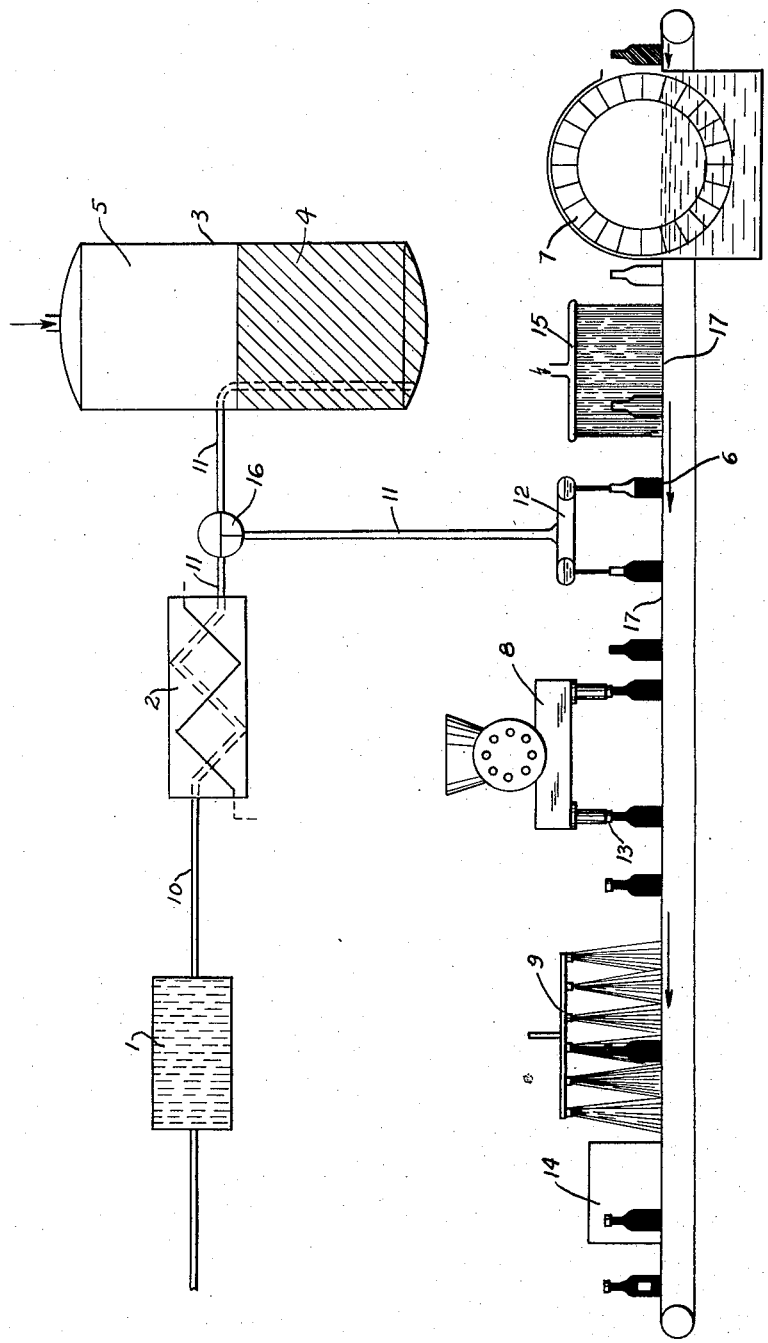

METHOD FOR FILLING CONTAINERS WITH CARBON-DIOXIDE CONTAINING BEVERAGES

Bruno Kaiser, Hamburg, Germany

Application March 12, 1956, Serial No. 570,770

Claims priority, application Germany March 11, 1955

6 Claims. (Cl. 99—49)

The present invention relates to a method for filling containers with beer or other carbon dioxide-containing beverages, and more particularly to a method for filling containers with carbon dioxide-containing beverages wherein the beverage is sterile when introduced into the container and remains sterile when stored in the container over prolonged periods of time.

The pasteurization of beers, and particularly beers for export and those beers which are produced from extract-poor worts and which are bottom fermented, for the purpose of increasing the stability of the beer, is known. In such cases the beer is pasteurized in closed transport vessels such as barrels, vats and the like. The yeast, bacteria and other germs are thereby killed. The beer is then introduced into non-sterile individual containers therefore which after being filled are closed. These are then subsequently heated generally in a water bath, or by flowing water. This generally requires about 20 to 30 minutes for heating up the container and contents, a pasteurization time of 30 to 40 minutes and the cooling time of about 20 to 40 minutes. During the pasteurization, the temperature is maintained at about 60–70° C.

The above described process has many disadvantages connected therewith. The process results in a change in taste of the beer and often in spoiling or impairing of the taste, whereby there is in fact even the danger of beer developing a bread-like taste. In addition there is the possibility that this type of pasteurization can result in producing a turbidity in the beer, particularly by changing the colloidal substances and the carbon dioxide-containing compounds. The above method can also possibly result in a coloring of the beer by oxidation thereof.

From the point of view of operation, the known method results in considerable time loss due to the interruption of the continuity of the assembly line, this resutling in increased labor costs and in impairing the efficiency of the equipment.

Moreover this requires large storage space and transportation equipment, all of which results in an increase in the energy expenses, general costs and the investment costs.

In the case of the particularly widely used pasteurization methods carried out in flasks there are additional further disadvantages. The glass material is sensitive and is only suitable for a limited period of time. As a result there are considerable losses of substance due to the losses occasioned by damaged flasks, especially with non-uniform wall strengths. Moreover there are washing difficulties by the application of insufficient sealing means (inferior pressure capacity of the cork caps or clamp seal for the flasks). The loss of packing material and of finished beer is thereby considerable.

On the other hand a pasteurization by flowing through in a plate sterilizing apparatus is also possible. In such treatment the yeast, bacteria and other germs are also killed by heat while the beer is in the flowing through process is heated for a few seconds at the pasteurization temperature and then very quickly after being kept at the pasteurization temperature for only a short time (about 30 seconds) is cooled. The above described disadvantages can in this manner be partially avoided if the pressure of the liquid is always above the carbon dioxide saturation pressure. The rapid cooling which is necessary by proceeding according to this method has a detrimental effect on the stability of the beer, making the same more susceptible to outside influences. The beer is thus made highly sensitive to becoming turbid when cold and the albumin stability thereof is lowered.

According to this pasteurization method, the filling of the individual containers in which the beer is transported is also possible only after the pasteurization. Absolute sterility of the containers is absolutely essential in order to obtain an unobjectionable stable beer. This requirement, if not met results in the pasteurized and considerably weakened beer being susceptible to post-infection (for example the protective action of the yeast is no longer available).

It is however truly difficult and expensive to attain such absolute sterility of the containers in which the beer is transported. The danger of post-infection in this type of process is much greater where great value is placed on the possibility of being able to lower the temperature of the beer after pasteurization to the lowest possible value during filling in order to prevent a spurting of the beer from the container upon removal of the filling member therefrom, which spurting might take place due to high temperature of the beer with consequent high degree of over saturation of the beer with carbon dioxide. The beer for this reason is after pasteurization by pre-cooling and deep-cooling brought to a temperature of about 1° C. before the bottles and cans are filled therewith.

It is finally also possible to achieve a degermination of the beers through plate filters, which are also designated as de-germination filters. The filtering material of such filter achieves a sharp filtration by a high content of asbestos. Through the filter layer of a de-germination filter of this type, the cold beer is pressed in order to obtain a de-germination. However this process also leaves much to be desired. The smallest germs (bacteria), in order to be removed, must be so sharply filtered that the necessary larger beer colloids are also removed. As a result, the color, taste and foam stability of the beer is deleteriously affected and the composition of the beer, particularly the albumin stability (removal of protective colloids) is changed.

It is therefore a primary object of the present invention to provide a method for avoiding all of the above enumerated difficulties of the known methods of filling containers with beer or other carbon dioxide-containing beverages.

It is another object of the present invention to provide a method for filling containers with beer or other carbon dioxide-containing beverages in which the beverage remains stable in the container over prolonged periods of time and in which there is no deleterious effect on the taste, color and stability of the beer.

Other objects and advantages of the present invention will be apparent in a further reading of the specification and of the appended claims.

With the above objects in view, the present invention mainly consists in a method of filling containers with carbon dioxide-containing beverages, comprising the steps of sterilizing a carbon dioxide-containing beverage, sterilizing a container, introducing the sterilized carbon dioxide-containing beverage into the sterilized container, and sealing the container containing the sterilized carbon dioxide-containing beverage.

Although the present invention is discussed mainly with reference to beer, it is to be understood that the invention is also applicable to other carbon dioxide-containing beverages.

In accordance with the present invention, all of the disadvantages of the prior art are avoided by heating the beer or other beverage to the pasteurization or sterilization temperature thereof for a sufficient time to sterilize the beer and then introducing the thus sterilized beer into the small containers or vessels (bottles or cans) for the beer which containers or vessels have themselves been previously sterilized. By proceeding in this manner the surprising result is obtained that there is no danger of the beer spurting out of the vessel upon removal of the filling member therefrom. Prior to the present invention this danger had been considered so great that a filling of containers immediately after pasteurization without intermediate cooling was only considered possible where the liquid either contained no carbon dioxide or only very little carbon dioxide as, for example, in the case of cider, or where steel containers were utilized which were provided with automatically acting closure valves which acted to prevent the spurting out of the beer when the filling or closure element was removed.

It has been found that in accordance with the present invention it is possible to fill the sterilized containers, which may be bottles or cans, immediately after the pasteurization or heating of the beer without any intermediate cooling thereof, and without the necessity of providing the container with an automatically acting closure valve.

The method of the present invention allows for considerable improvement and simplification of the entire method of bottling and canning of beer by the provision of sterilized bottles or cans. The sterilization or pasteurization of the containers can be carried out in a simple manner in through-flow sterilizers. The filling of the containers is easily carried out in a continuous manner by continuously transporting the bottles or cans from the washing and sterilizing apparatus to the liquid dispensing apparatus. The measures for keeping the liquid dispensing means and the entire filling process sterile can be reduced to a minimum and the danger of post-infection is in any event considerably lessened since the beer is bottled in hot condition and consequently all dangers which are connected with cooling of the beer prior to bottling thereof are avoided.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing, in which the drawing schematically illustrates one embodiment of an apparatus for carrying out the method of the present invention.

Referring more particularly to the drawing, there is illustrated a filter 1 connected to a plate sterilizer 2 by means of a conduit 10. The plate sterilizer 2 in contrast to the usual plate sterilizers for beer or other carbon dioxide-containing beverages is only heated so as to pasteurize the beverage, without the beverage being subsequently cooled in the sterilizer.

The sterilizer 2 is connected to a pressure tank 3 and a liquid dispensing device 12 by means of conduit 11 which is provided with a three-way valve 16. The three-way valve 16 has three operative positions. In one of the operative positions the three-way valve permits the beverage to flow from the sterilizer 2 to the liquid dispensing device 12 with the flow to the pressure tank 3 being cut off. In a second operative position, the three-way valve 16 permits the liquid to flow from the sterilizer 2 to the pressure tank 3 with the flow to the liquid dispensing device 12 being cut off. In the third operative position, the three-way valve 16 permits liquid to flow from the pressure tank 3 to the liquid dispensing device 12, the flow to the sterilizer 2 being cut off. The pressure tank 3 is arranged so that in the lower portion there is liquid, indicated by 4 and in the upper portion there is carbon dioxide gas under pressure, indicated by 5. In this manner the pressure tank by the carbon dioxide pressure in the upper portion thereof can cause the beer contained therein to flow through the conduit 11 to the liquid dispensing device 12, when the three-way valve 16 is in the proper operating position. In addition, due to the carbon dioxide gas under pressure in the upper portion of the tank there is an assurance that no carbon dioxide will be removed from the beer.

The pasteurized beer coming either directly from the sterilizer 2 or from the pressure tank 3 through the conduit 11 to the liquid dispensing device 12 is introduced into the containers, such as bottles 6. In accordance with the present invention, the containers 6 are first washed in a washing device 7 and then sterilized, for example by means of an ultra-violet ray sterilizer 15 before being filled by the liquid dispensing device 12. The containers 6 are transported from the washing machine 7 to the sterilizer 15 to the liquid dispensing device 12 in subsequent stages by means of the endless conveyor belt 17.

After the sterilized containers 6 have been filled by the liquid dispensing device 12, the bottles are corked by sealing device 8 with corks 13, then cooled by cooling device 9 which for example may spray jets of cool air into the sealed bottles, and then the bottles are labelled by means of labelling device 14.

The following example more clearly illustrates the operation of the device of the present invention as well as the method of the present invention.

The beer is pumped by means of a pump which is not illustrated from a storage tank, through the filter 1. It then passes through conduit 10 to the plate sterilizer 2 in which the beer is pasteurized by being subjected to a temperature of 60–70° C. for about 30–40 seconds. The pasteurized beer is then conducted by means of conduit 11 to the pressure tank 3 and from the tank to the liquid dispensing device 12, where the beer still at the same temperature e.g. between 60–70° C. is introduced into the bottles 6. These bottles had been previously sterilized by being washed in the washing device 7 with hot superchlorinated water and then after washed so that they leave the washing device 7 in sterile condition. It is frequently possible to transport the bottles 6 directly from the washing device 7 to the liquid dispensing device 12 without any further steps for sterilization of the bottles being taken. However, in this example, in order to be certain of sterility, the bottles after leaving the washing device 7 are subjected to ultra-violet rays by device 15, which helps to assure the avoiding of post-infection. Other devices can of course be used for the same purpose.

The bottles 6 after being filled are then corked by means of corks 13. It is of course also possible to sterilize the corks prior to sealing the bottles therewith.

The sealed bottles are then cooled by means of the cooling device 9 which is preferably operated by blowing air at normal temperature onto the bottles. It is of course also possible to further cool the filled and sealed bottles. After cooling, the bottles are labelled in the usual manner by means of labelling device 14.

It will be understood that each of the elements described above, or two or more together, may also find a useful application in other types of apparatus and methods of filling containers differing from the types described above.

While the invention has been illustrated and described as embodied in apparatus and methods of filling containers with carbon dioxide-containing beverages such as beer, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of filling containers adapted to be used for direct consumption with carbon dioxide-containing beverages comprising the steps of heating a carbon dioxide-containing beverage to the pasteurization temperature thereof for sufficient time to pasteurize the same, providing a container adapted to be used for direct consumption, heating and sterilizing said container, introducing said pasteurized carbon dioxide-containing beverage while still hot into said heated and sterilized container with a counter-pressure filler, and sealing said container.

2. A method of filling containers adapted to be used for direct consumption with carbon dioxide-containing beverages comprising the steps of heating a carbon dioxide-containing beverage to the pasteurization temperature thereof for sufficient time to pasteurize the same, providing a container adapted to be used for direct consumption, heating and sterilizing said container, introducing said pasteurized carbon dioxide-containing beverage while still hot into said heated and sterilized container with a counter-pressure filler, removing the container from said counter-pressure filler whereby the container is momentarily opened to the atmosphere, and sealing said container.

3. A method of filling containers adapted to be used for direct consumption with beer, comprising the steps of heating the beer to the pasteurization temperature thereof for sufficient time to pasteurize the same, providing a container adapted to be used for direct consumption, heating and sterilizing said container, introducing said pasteurized beer while still hot into said heated and sterilized container with a counter-pressure filler, removing the container from said counter-pressure filler whereby the container is momentarily opened to the atmosphere, and sealing said container.

4. A method of filling containers adapted to be used for direct consumption with carbon dioxide-containing beverages, comprising the steps of pressurizing and heating a carbon dioxide-containing beverage to the pasteurization temperature thereof for sufficient time to pasteurize the same, providing a container adapted to be used for direct consumption, heating and sterilizing said container, introducing said pasteurized and pressurized carbon dioxide-containing beverage while still hot into said heated and sterilized container with a counter-pressure filler, removing the container from said counter-pressure filler whereby the container is momentarily opened to the atmosphere, and sealing said container.

5. A method of filling containers adapted to be used for direct consumption with carbon dioxide-containing beverages, comprising the steps of heating a carbon dioxide-containing beverage to the pasteurization temperature thereof for sufficient time to pasteurize the same, providing a container adapted to be used for direct consumption, heating and sterilizing said container, introducing said pasteurized carbon dioxide-containing beverage while still hot into said heated and sterilized container with a counter-pressure filler, removing the container from said counter-pressure filler whereby the container is momentarily opened to the atmosphere, sealing said container, and cooling said sealed container.

6. A method for filling containers adapted to be used for direct consumption with beer comprising the steps of pressurizing and heating the beer to the pasteurization temperature thereof for a sufficient time to pasteurize the same, providing a container adapted to be used for direct consumption, heating and sterilizing said container, introducing said pressurized and pasteurized beer while still hot into said heated and sterilized container with a counter-pressure filler, removing the container from said counter-pressure filler whereby the container is momentarily opened to the atmosphere, conveying said container from said filler to a sealer, sealing said container, and cooling said sealed container.

References Cited in the file of this patent

UNITED STATES PATENTS

| | | |
|---|---|---|
| 497,327 | Kropff | May 16, 1893 |
| 503,168 | Schneider | Aug. 15, 1893 |
| 626,486 | Clerc | June 6, 1899 |
| 1,141,056 | Helbronner et al. | May 25, 1915 |
| 2,196,299 | Glunz | Apr. 9, 1940 |
| 2,204,131 | Glunz | June 11, 1940 |